No. 840,300. PATENTED JAN. 1, 1907.
J. F. COLLINS.
DUMP AND ELEVATOR.
APPLICATION FILED AUG. 31, 1906.
3 SHEETS—SHEET 1.
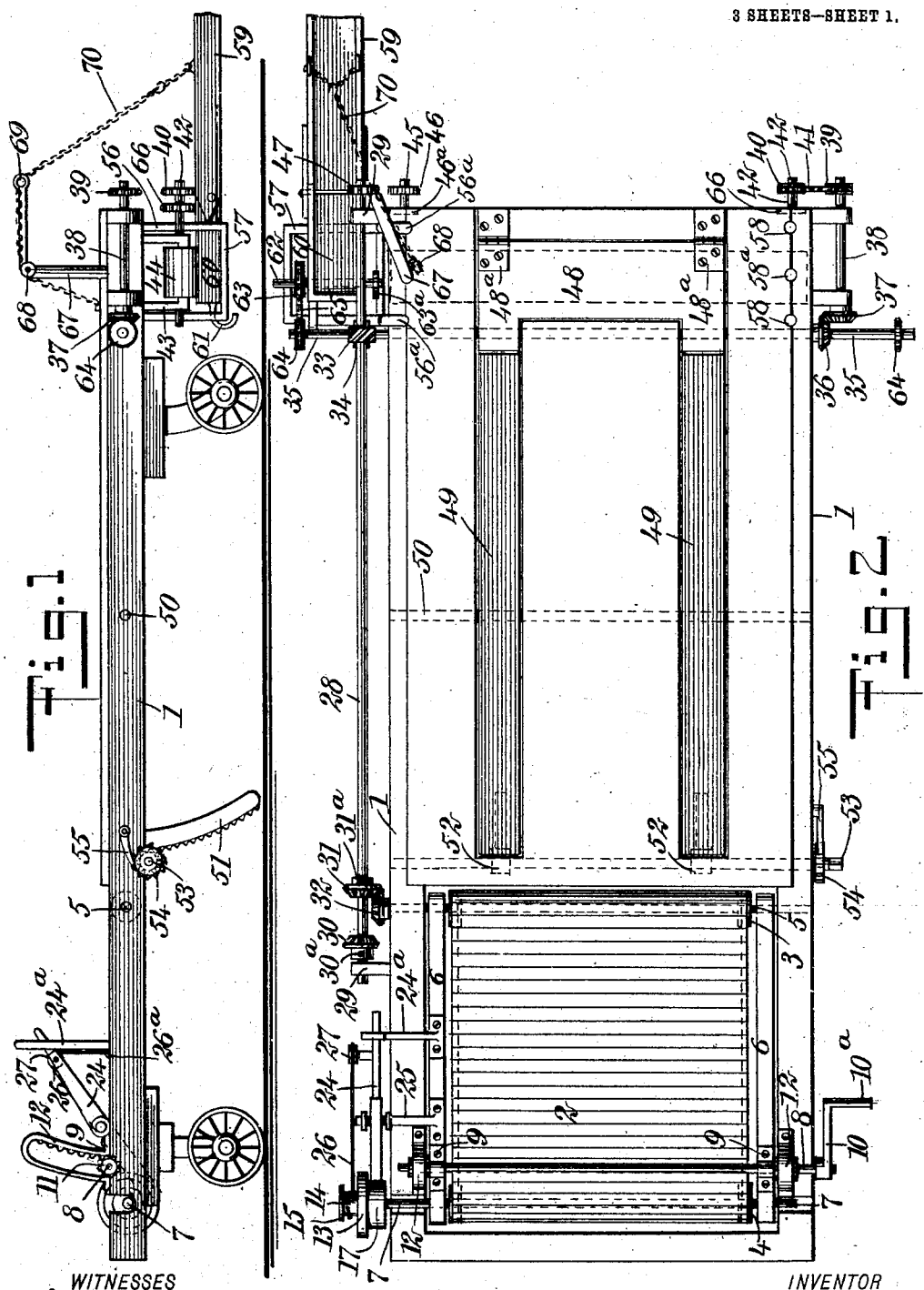
WITNESSES
INVENTOR
James F. Collins
BY Munn & Co
ATTORNEYS No. 840,300. PATENTED JAN. 1, 1907.
J. F. COLLINS.
DUMP AND ELEVATOR.
APPLICATION FILED AUG. 31, 1906.
3 SHEETS—SHEET 2.
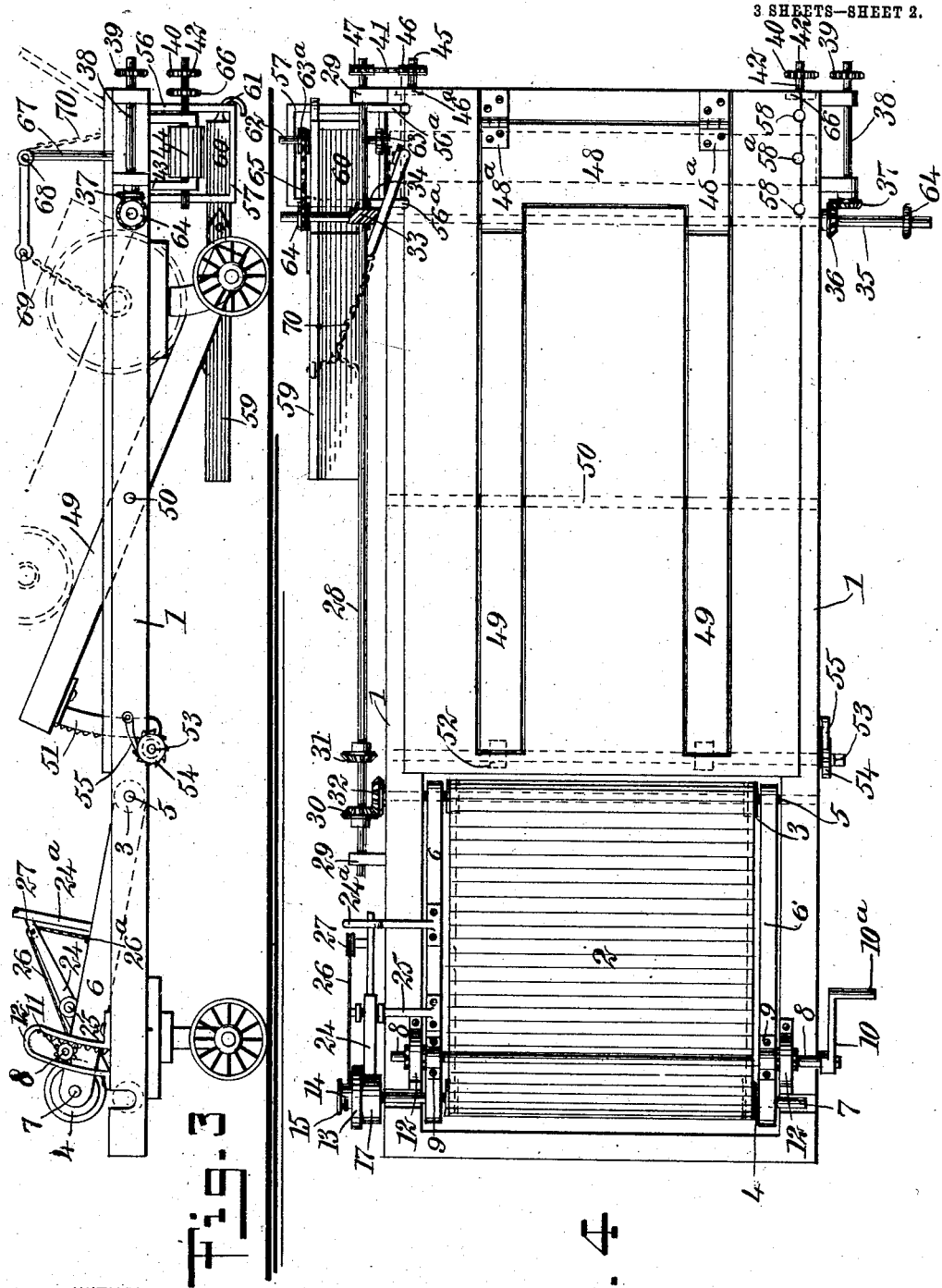
WITNESSES
INVENTOR
James F. Collins
BY Munn & Co
ATTORNEYS No. 840,300. PATENTED JAN. 1, 1907.
J. F. COLLINS.
DUMP AND ELEVATOR.
APPLICATION FILED AUG. 31, 1906.
3 SHEETS—SHEET 3.
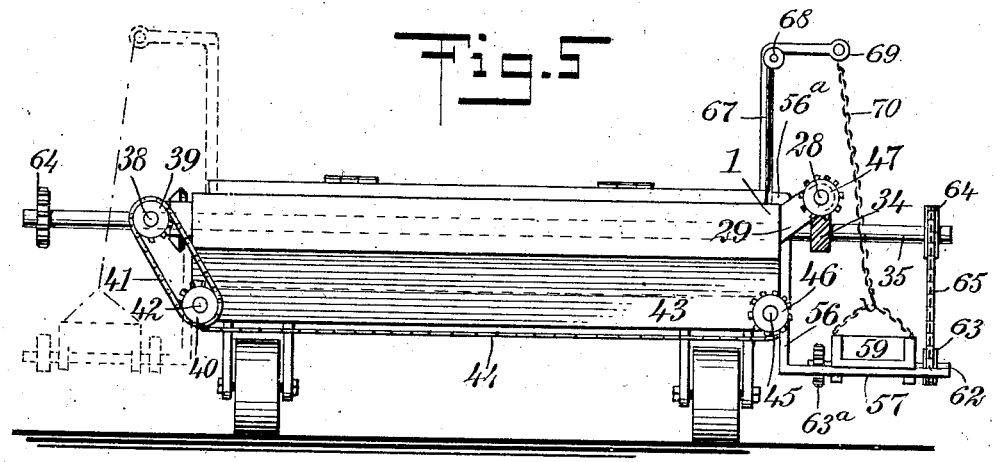
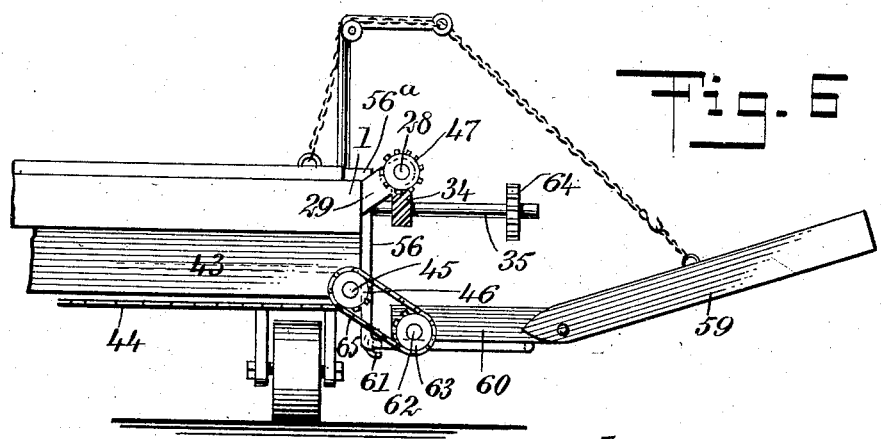
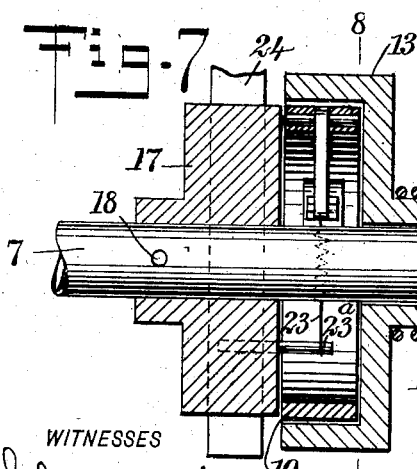
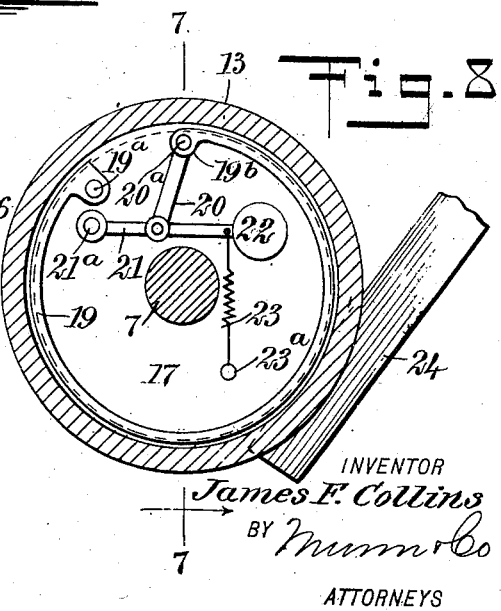
WITNESSES
INVENTOR
James F. Collins
BY Munn & Co
ATTORNEYS

UNITED STATES PATENT OFFICE.

JAMES F. COLLINS, OF MARCUS, IOWA.

DUMP AND ELEVATOR.

No. 840,300.  Specification of Letters Patent.  Patented Jan. 1, 1907.

Application filed August 31, 1906. Serial No. 332,743.

*To all whom it may concern:*

Be it known that I, JAMES F. COLLINS, a citizen of the United States, and a resident of Marcus, in the county of Cherokee and State of Iowa, have invented a new and Improved Dump and Elevator, of which the following is a full, clear, and exact description.

My invention has for its principal objects to provide a combined and dump elevator adapted to unload and elevate the contents of a wagon by means of a team while attached to the wagon and to provide means for enabling the device to be used in narrow passageways and between cribs, so as to convey grain to many different cribs or bins without removing the machine or using a drag. Such objects I accomplish by the means illustrated in the accompanying drawings, in which drawings like characters of reference indicate like parts throughout the views, and in which—

Figure 1 is a side elevation of a combined dump and elevator embodying my invention. Fig. 2 is a plan view of the same. Fig. 3 is a side elevation of the parts shown in Fig. 1 with the horse-tread and wagon-tread inclined to the main frame of the machine. Fig. 4 is a plan view of the machine, showing an elevator attached to the rear end of the machine and extending forwardly. Fig. 5 is an end view of the machine embodying my invention. Fig. 6 is an end view of a machine, showing the elevator extending at right angles to the main frame. Fig. 7 is a vertical longitudinal section taken on the line 7 7 of Fig. 8, showing the clutch secured to the forward transverse shaft of a tread; and Fig. 8 is a vertical transverse elevation taken on the line 8 8 of Fig. 7.

As illustrated in the drawings, 1 represents the main frame of the machine, which may be mounted upon running-gear of any suitable construction. Inclined approaches may be extended from the ends of the main frame to the ground to enable a team and wagon to pass up onto the main frame and to descend therefrom. A tread 2 is mounted upon the forward end of the main frame and consists of an endless apron passing around end drums 3 and 4. The drum 3 is mounted upon a shaft 5, journaled on the main frame. Side bars 6 are also mounted upon the shaft 5 and form the sides of the frame upon which the tread 2 is mounted. The drum 4 is mounted upon a tranverse shaft 7, which is journaled in the forward ends of the side bars 6 and extends at both ends beyond said side bars, so as to rest on the side bars of the main frame, and when in such position supports the tread 2 in the plane of the floor of the main frame. The shaft 7 is adapted to be raised bodily with the forward end of the tread 2, the rear end of the tread being held permanently in position by means of the transverse shaft 5, journaled in the side bars of the main frame. The forward end of the tread is elevated by means of a transverse shaft 8, journaled in bearing-boxes 9, attached to the forward end of the tread 2 and provided on its outer end with a crank-lever 10, having a handle 10ª formed thereon. The ends of the transverse shaft 8 are provided with pinions 11, which engage arc racks 12, mounted upon the side bars of the main frame. As the shaft 8 is rotated by means of the crank-lever 10 the pinions 11 ride upwardly on the arc racks 12, and thereby adjust the inclination of the tread 2 to develop the power required. The forward transverse shaft 7 is provided with a clutch, consisting of an outer casing 13, freely mounted on said shaft and provided with a flanged hub 14. A collar 15 is secured to said shaft by means of set-screws 16 and holds the clutch in place on said shaft.

A head 17 is rigidly secured to the shaft 7 by means of a set-screw 18, and a springband 19 is secured at one end to the side of said head by means of a stud or pivot 19ª, and the opposite end 19ᵇ of said band is pivotally attached to one end of a link 20 by means of a pivot-pin 20ª. The opposite end of said link is pivotally connected to a lever 21, that is fulcrumed on the clutch-head 17 by means of a pin 21ª. The lever 21 is provided with a weight 22 preferably in the form of a cylindrical disk, and the portion of the lever adjacent to said weight is connected to a spring 23, secured at its opposite end to the head 17 of the clutch by means of a pin or stud 23ª. A brake-shoe is formed on the end of a bar 24, which is rotatably mounted on a bracket 25, attached to the frame of the tread 2 and provided with a pulley 27, supporting a cord 26, one end of which cord is secured to the hub 14 of the outer casing of the clutch, and the opposite end 26ª is secured to the main frame of the machine. The spring 23 holds the lever 21 normally in the position indicated in Fig. 8 of the drawings. As the speed of the tread increases the centrifugal force generated by the revolution of the clutch-head 17 carries the weighted end of the lever 21 outward from the shaft 7 and causes the free end 19$^b$ of the spring-band 19 to bind against the surface of the inner wall of the casing 13, thereby rotating said casing with the shaft 7, upon which it is mounted. As the casing 13 rotates the cord 26 winds around the hub 14 of the casing and shortens said cord, thereby pressing downward on the pulley 27, mounted upon the brake-bar 24 and bringing the brake-shoe against the periphery of the head 17, so as to retard the rotation of the shaft 7, upon which the said head is mounted. After the speed has been reduced by the brake-shoe the centrifugal force of the lever 21 is overcome by the spring 23 and the weighted end of the lever drawn inward by said spring toward the shaft 7, thereby drawing inward the free end 19$^b$ of the spring-band 19 and releasing said band from the inner wall of the casing 13, so as to enable said casing to ride idly on the shaft 7. A drive-shaft 28 is journaled in boxes 29, secured to the sides of the main frame, and the forward end of said shaft is provided with bevel-gears 30 and 31, adjustably secured to said shaft by means of set-screws 30$^a$ and 31$^a$, as shown in Fig. 2, and adapted to engage a corresponding bevel-gear 32, secured to the end of the transverse shaft 5, upon which the rear end of the tread 2 is mounted. By means of the adjustability of the gears 30 and 31 on the shaft 28 either of said gears may be brought into engagement with the bevel-gear 32, attached to the tread-shaft 5, and thereby rotate the shaft 28 to the right or left, as may be desired. The rear end of the drive-shaft 28 is provided with a sprocket-wheel 47 and with a worm 33. The worm 33 engages a gear 34, attached to a shaft 35, which extends transversely of the rear end of the main frame and is journaled in suitable bearings on said frame. The shaft 35 is thereby adapted to rotate to the right or left as the bevel-gear 30 or 31 of the drive-shaft 28 is brought into engagement with the gear 32 of the tread-shaft. A bevel-gear 36 is mounted upon the opposite end of the transverse shaft 35, and the extremities of said shaft are provided with sprocket-wheels 64 for the purposes hereinafter described.

A short shaft 38 is journaled on the end of the main frame and is provided on one end with a bevel-gear 37, adapted to engage the bevel-gear 36 of the transverse shaft 35. The opposite end of the shaft 38 is provided with a sprocket-wheel 39. The sprocket-wheel 39 of the short shaft 38 and the corresponding sprocket-wheel 47 of the drive-shaft 28 are adapted to operate a transverse conveyer secured to the end of the main frame and comprising an endless belt 44, mounted upon drums which are attached to shafts 42 and 45, having bearings in a transverse casing 43, secured to the end of the main frame, as shown in Fig. 3. The shaft 42 is provided with an outer sprocket-wheel 40 and an inner sprocket-wheel 66, and the opposite shaft 45 is provided with an outer sprocket-wheel 46 and an inner sprocket-wheel 46$^a$, as shown in Fig. 4. An endless belt 41 is connected with the sprocket-wheel 47, attached to the drive-shaft 28, and with the sprocket-wheels 46, mounted in the shaft 46 of the transverse conveyer, so as to operate the transverse conveyer from the drive-shaft 28. The endless belt 41 may be removed from the sprocket-wheels 46 and 47 and connected with the sprocket-wheels 39 and 40 on the opposite side of the main frame, so as to operate the transverse conveyer in an opposite direction.

An opening is made in the rear end of the floor of the main frame of the machine directly above the transverse conveyer 44, and when the machine is not in use the opening is closed by a trap-door 48, secured to the rear end of the main frame by means of hinges 48$^a$. Wagon-treads 49, consisting of longitudinal bars, are pivotally mounted upon a transverse shaft 50, which is connected at its ends to the sides of the main frame. The forward ends of said treads are provided with arc racks 51, which engage pinions 52, mounted upon a transverse shaft 53, journaled on the side bars of the main frame. The shaft 53 is provided with a ratchet-wheel 54, the teeth of which engage a pawl 55, secured to the main frame. The ends of the shaft 53 are preferably square, as shown in Fig. 2, and thereby adapted to be grasped by a wrench or crank, so as to rotate the shaft 53 and elevate or depress the forward end of the wagon-treads 49, as may be desired. An elevator is detachably mounted upon the end of the main frame by means of brackets 56, provided with offset upper ends 56$^a$, adapted to engage apertures 58, formed on the rear end of the main frame and on both sides thereof, so as to enable said bracket and the elevator supported thereon to be attached to either side of the main frame. The bracket is provided on its lower end with horizontal bars 57, adapted to support a receiver 60, having an elevator-chute 59, pivotally attached thereto. The receiver 60 is secured against displacement on the bracket by means of hooks 61, which engage the lower bars 57 of the bracket.

By means of such construction the elevator-chute 59 is adapted to extend backward from the machine, as shown in Figs. 1 and 2, or forward, as shown in Figs. 3 and 4, or at a right angle thereto, as shown in Fig. 6. The receiver 60 of the elevator is provided with a shaft 62, having sprocket-wheels 63 and 63$^a$ attached thereto on opposite sides of the receiver.

A standard 67 is secured to the rear end of the main frame in any suitable manner, preferably by engaging apertures 58$^a$, formed on opposite sides of the end of the main frame, and is provided with a pulley 68 and an eye 69, adapted to support a chain 70, one end of the chain being connected to the elevator-chute 59 and the other end with a drum or other suitable means adapted to elevate the chute and hold the same at the desired elevation. The standard 67 is adapted to be rotated on its axis so that the bent upper portion thereof may extend toward the rear, the front, or the side of the machine and support the elevator-chute 59 when arranged in either of such positions. An endless conveyer may be mounted on the elevator-chute 59 and receiver 60 and connected with the shaft 62, having a sprocket-wheel 63 and 63ª mounted thereon. The shaft 62 of the elevator is operated by means of the transverse shaft 35, when the elevator extends to the front or rear of the machine, an endless belt 65 connecting the end sprocket-wheel 64 of the transverse shaft 35 with the sprocket-wheels mounted upon the transverse shaft 62 of the elevator. When, however, the elevator is extended outward at a right angle to the machine, the shaft 62 of the elevator is rotated by one of the end shafts of the transverse conveyer 44, the sprocket-wheels of which may be connected with the sprocket-wheels of the shaft 62 by means of the endless belt 65, as shown in Fig. 6. An endless conveyer may be mounted upon the receiver 60 and chute 59 in any suitable manner, and connected with the shaft 62 so as to be operated thereby.

In the construction herein shown and described, I have provided a combined dump and elevator adapted to be operated without detaching the team from the wagon being unloaded and have provided means for transferring the contents of the wagon to either side of the machine and for elevating such contents from either side of the machine in a direction forward or backward or directly outward therefrom, and I do not desire to be limited to the specific means herein shown and described for accomplishing such results, as other means having similar capabilities may be used without departing from my invention.

Having thus described my invention, what I claim as new, and desire to secure by Letters Patent, is—

1. The combination with a main frame, of a horse-tread and a wagon-tread mounted on said frame and adapted to be inclined thereto independently of each other, a conveyer extending transversely of the main frame at the rear of the wagon-tread, means connected with the horse-tread adapted to rotate said conveyer in opposite directions, an inclined conveyer adapted to be detachably secured to the main frame and adapted to be arranged and operated at either end of the transverse conveyer, and means for operating said inclined conveyer connected with the horse-tread, substantially as shown and described.

2. The combination with a main frame, of a horse-tread comprising an endless apron mounted upon drums journaled in side bars pivoted to the main frame, a brake-clutch secured to the forward drum of said frame, and means for elevating the forward end of said frame relatively to the main frame, substantially as shown and described.

3. The combination with a main frame, of a horse-tread frame pivoted thereto, an endless apron mounted on said tread-frame, and means for elevating the forward end of said tread-frame, comprising arc racks and rotatable pinions adapted to engage said racks, substantially as shown and described.

4. The combination with a horse-tread and frame pivotally mounted upon a transverse shaft, and a governor comprising a head fixedly secured to said shaft and provided with an expandible band secured at one end to said head, a weighted lever connected with said band, a spring connected with said lever, a casing freely mounted on said shaft, a pivoted lever supported on said tread-frame, and a cable connected with said lever and casing, substantially as shown and described.

5. The combination with a main frame, of a transverse shaft journaled in said main frame and provided with a beveled gear, a horse-tread frame having a rocking movement on said shaft and provided with an endless belt, a longitudinal shaft provided with oppositely-disposed gears adapted to engage the beveled gear of the transverse shaft, and rotate said longitudinal shaft in opposite directions, a wagon-tread pivotally mounted on the main frame, a conveyer arranged at the end of the wagon-tread, and means connected with said conveyer and the longitudinal shaft adapted to rotate said conveyer, substantially as shown and described.

6. The combination of a main frame, a horse-tread and a wagon-tread pivotally mounted upon the main frame, means adapted to elevate the forward ends of said horse-tread and wagon-tread independently of each other, consisting of arc racks, and pinions mounted upon the transverse shafts engaging said racks, substantially as shown and described.

7. The combination with a main frame, of a horse-tread and a wagon-tread pivoted to said frame, and adjustable vertically at their forward ends independently of each other, a conveyer arranged at the rear end of the wagon-tread and adapted to rotate transversely of said frame to the right or the left thereof, an inclined conveyer detachably secured to said frame and adapted to be adjustable independently of the transverse conveyer so as to extend in line with said transverse conveyer, or in opposite directions parallel with the main frame, and a transverse shaft secured to the main frame, connected with the horse-tread, and provided on each end with means adapted to operate said inclined conveyer when extending in a line parallel with the main frame, substantially as shown and described.

8. The combination with a main frame, of a horse-tread and a wagon-tread pivoted thereto and adapted to be inclined relatively to the main frame independently of each other, a transverse conveyer secured to the main frame at the rear end of the wagon-frame, a detachable vertical conveyer adapted to be attached to either side of the main frame and arranged on each of those sides in line with said transverse conveyer, or in opposite directions parallel to the main frame, a transverse shaft journaled on the main frame at the rear end thereof and provided on its ends with means adapted to be connected to the inclined elevator when arranged in line with the main frame, and a longitudinal shaft connected with the horse-tread and provided with means adapted to operate said transverse shaft, substantially as shown and described.

In testimony whereof I have signed my name to this specification in the presence of two subscribing witnesses.

JAMES F. COLLINS.

Witnesses:
    W. L. GUND,
    DAN COLLINS.